United States Patent
Bae et al.

(10) Patent No.: US 12,467,980 B2
(45) Date of Patent: Nov. 11, 2025

(54) APPARATUS AND METHOD FOR DIAGNOSING BATTERY

(71) Applicant: LG Energy Solution, Ltd., Seoul (KR)

(72) Inventors: Yoon-Jung Bae, Daejeon (KR); Kyung-Hwa Woo, Daejeon (KR); Hee-Seok Jeong, Daejeon (KR); A-Ming Cha, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 18/874,390

(22) PCT Filed: Nov. 1, 2023

(86) PCT No.: PCT/KR2023/017289
§ 371 (c)(1),
(2) Date: Dec. 12, 2024

(87) PCT Pub. No.: WO2024/096584
PCT Pub. Date: May 10, 2024

(65) Prior Publication Data
US 2025/0164571 A1    May 22, 2025

(30) Foreign Application Priority Data
Nov. 1, 2022    (KR) .......... 10-2022-0143796

(51) Int. Cl.
*G01R 31/392* (2019.01)
*G01R 31/3842* (2019.01)

(52) U.S. Cl.
CPC ....... *G01R 31/392* (2019.01); *G01R 31/3842* (2019.01)

(58) Field of Classification Search
None
See application file for complete search history.

(56) References Cited

U.S. PATENT DOCUMENTS

| | | |
|---|---|---|
| 2001/0022518 A1 | 9/2001 | Asakura et al. |
| 2003/0076074 A1 | 4/2003 | Kawai |
| 2012/0130661 A1 | 5/2012 | Hagimori et al. |

(Continued)

FOREIGN PATENT DOCUMENTS

| | | |
|---|---|---|
| CN | 111136033 A | 5/2020 |
| JP | H11329512 A | 11/1999 |

(Continued)

OTHER PUBLICATIONS

International Search Report for Application No. PCT/KR2023/017289 mailed Feb. 22, 24, pp. 1-3.

(Continued)

*Primary Examiner* — Jas A Sanghera
(74) *Attorney, Agent, or Firm* — Lerner David LLP (57) ABSTRACT

An apparatus for diagnosing a battery includes a data obtaining unit configured to obtain battery information including voltage and current of a battery during a charging cycle of the battery, and a control unit configured to calculate a constant current charging capacity ratio and a constant voltage charging capacity ratio during the charging cycle based on the battery information, and determine a deterioration type of the battery based on the constant current charging capacity ratio and the constant voltage charging capacity ratio.

12 Claims, 5 Drawing Sheets

(56) References Cited

U.S. PATENT DOCUMENTS

| | | | |
|---|---|---|---|
| 2016/0245876 A1 | 8/2016 | Vinassa et al. | |
| 2019/0162796 A1 | 5/2019 | Soejima et al. | |
| 2020/0335979 A1 | 10/2020 | Kim et al. | |
| 2021/0325476 A1 | 10/2021 | Bae et al. | |
| 2022/0373607 A1 | 11/2022 | Kim et al. | |
| 2023/0045708 A1* | 2/2023 | Shim | H02J 7/0048 |
| 2023/0178818 A1 | 6/2023 | Jeong et al. | |
| 2024/0012061 A1* | 1/2024 | Ikeda | G01R 31/389 |

FOREIGN PATENT DOCUMENTS

| | | | |
|---|---|---|---|
| JP | 2002162451 A | 6/2002 |
| JP | 2003132955 A | 5/2003 |
| JP | 3460567 B2 | 10/2003 |
| JP | 2012115004 A | 6/2012 |
| JP | 2017020916 A | 1/2017 |
| JP | 6485708 B2 | 3/2019 |
| JP | 6502331 B2 | 4/2019 |
| JP | 6770933 B2 | 10/2020 |
| JP | 6933109 B2 | 9/2021 |
| JP | 2022536310 A | 8/2022 |
| JP | 2023516953 A | 4/2023 |
| KR | 20120056200 A | 6/2012 |
| KR | 20180005345 A | 1/2018 |
| KR | 101952406 B1 | 2/2019 |
| KR | 20200111014 A | 9/2020 |
| KR | 20200122628 A | 10/2020 |
| KR | 20210030089 A | 3/2021 |

OTHER PUBLICATIONS

Extended European Search Report including Written Opinion for Application No. 23886280.9 dated May 16, 2025, pp. 1-10.

Wang, T. et al., "State of Health Estimation for Satellite Batteries Based on the Charge Curves" IEEE, Nov. 2021, pp. 1-4.

\* cited by examiner

APPARATUS AND METHOD FOR DIAGNOSING BATTERY

CROSS REFERENCE TO RELATED APPLICATIONS

The present application is a national phase entry under 35 U.S.C. § 371 of International Application No. PCT/KR2023/017289, filed on Nov. 1, 2023, now published as International Publication No. WO 2024/096584 A1, which claims priority from Korean Patent Application No. 10-2022-0143796, filed on Nov. 1, 2022, all of which are hereby incorporated herein by reference in their entireties.

TECHNICAL FIELD

The present disclosure relates to an apparatus and method for diagnosing a battery, and more particularly, to an apparatus and method for diagnosing a battery, which is capable of diagnosing a state of a battery in a non-destructive manner.

BACKGROUND

Recently, the demand for portable electronic products such as notebook computers, video cameras and portable telephones has increased sharply, and electric vehicles, energy storage batteries, robots, satellites and the like have been developed in earnest. Accordingly, high-performance batteries allowing repeated charging and discharging are being actively studied.

Batteries commercially available at present include nickel-cadmium batteries, nickel hydrogen batteries, nickel-zinc batteries, lithium batteries and the like. Among them, the lithium batteries are in the limelight since they have almost no memory effect compared to nickel-based batteries and also have very low self-charging rate and high energy density.

These batteries may deteriorate as charging and discharging continues. For example, gas generation may reduce electron transportation force within the electrode, resulting in negative electrode deterioration imbalance. Additionally, since the gas generated by the battery may lead to ignition, there is a problem that an unexpected accident may occur if the battery state diagnosis is not carried out quickly.

SUMMARY OF THE INVENTION

Technical Problem

The present disclosure is designed to solve the problems of the related art, and therefore the present disclosure is directed to providing an apparatus and method for diagnosing a battery, which may diagnose a state of battery in a non-destructive manner through profile analysis.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

An apparatus for diagnosing a battery according to one aspect of the present disclosure may comprise a control unit configured to calculate a constant current charging capacity ratio and a constant voltage charging capacity ratio during a charging cycle of the battery based on battery information, wherein the battery information includes voltage and current of the battery during the charging cycle, and determine a deterioration type of the battery based on the constant current charging capacity ratio and the constant voltage charging capacity ratio.

The control unit may be configured to obtain each of a constant current charging capacity and a constant voltage charging capacity from the charging total capacity, and calculate the constant current charging capacity ratio and the constant voltage charging capacity ratio, respectively, based on the charging total capacity, the constant current charging capacity and the constant voltage charging capacity.

The control unit may be configured to calculate the constant current charging capacity ratio and the constant voltage charging capacity ratio in response to the charging total capacity of the battery decreasing during the charging cycle of the battery.

The control unit may be configured to diagnose the deterioration type of the battery as a capacity deterioration type or a complex deterioration type based on a change rate of the constant current charging capacity ratio and a change rate of the constant voltage charging capacity ratio.

The control unit may be configured to compare the change rate of the constant current charging capacity ratio with a preset first change rate and compare the change rate of the constant voltage charging capacity ratio with a preset second change rate.

The control unit may be configured to diagnose the deterioration type of the battery as the complex deterioration type in response to the change rate of the constant current charging capacity ratio being less than the first change rate and the change rate of the constant voltage charging capacity ratio being greater than or equal to the second change rate.

The control unit may be configured to diagnose the deterioration type of the battery as the capacity deterioration type in response to the change rate of the constant current charging capacity ratio being greater than or equal to the first change rate and the change rate of the constant voltage charging capacity ratio being less than the second change rate.

The control unit may be configured to change a charging cut-off condition of the battery in response to the deterioration type of the battery being diagnosed as the complex deterioration type.

The control unit may be configured to reduce a cut-off voltage in the charging cut-off condition in response to the deterioration type of the battery being diagnosed as the complex deterioration type.

The control unit may be configured to increase a charging cut-off current in the charging cut-off condition in response to the deterioration type of the battery being diagnosed as the complex deterioration type.

The control unit may be configured to reduce a cut-off time in the charging cut-off condition in response to the deterioration type of the battery being diagnosed as the complex deterioration type.

A battery pack according to another aspect of the present disclosure may comprise the apparatus for diagnosing a battery as described in any of the embodiments of the present disclosure.

A method for diagnosing a battery according to still another aspect of the present disclosure may comprise: obtaining battery information including voltage and current of a battery during a charging cycle of the battery; calculating a constant current charging capacity ratio and a constant voltage charging capacity ratio during the charging cycle based on the battery information; and determining a deterioration type of the battery based on the constant current charging capacity ratio and the constant voltage charging capacity ratio.

Advantageous Effects

According to one aspect of the present disclosure, the state of the battery may be diagnosed in a non-destructive manner through profile analysis. In particular, the deterioration type of the battery may be specifically diagnosed using the constant current charging capacity ratio and the constant voltage charging capacity ratio of the battery.

The effects of the present disclosure are not limited to the effects mentioned above, and other effects not mentioned will be clearly understood by those skilled in the art from the description of the claims.

BRIEF DESCRIPTION OF THE DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

DETAILED DESCRIPTION

It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Additionally, in describing the present disclosure, when it is deemed that a detailed description of relevant known elements or functions renders the key subject matter of the present disclosure ambiguous, the detailed description is omitted herein.

The terms including the ordinal number such as "first", "second" and the like, may be used to distinguish one element from another among various elements, but not intended to limit the elements by the terms.

Throughout the specification, when a portion is referred to as "comprising" or "including" any element, it means that the portion may include other elements further, without excluding other elements, unless specifically stated otherwise.

In addition, throughout the specification, when a portion is referred to as being "connected" to another portion, it is not limited to the case that they are "directly connected", but it also includes the case where they are "indirectly connected" with another element being interposed between them.

Hereinafter, a preferred embodiment of the present disclosure will be described in detail with reference to the accompanying drawings.

Figure 1:
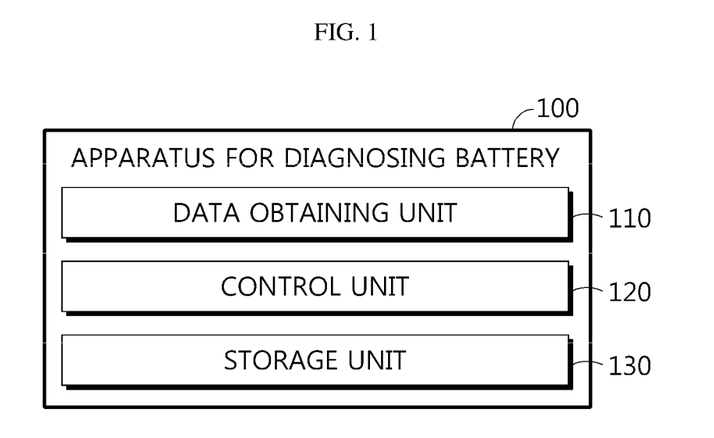
FIG. 1 is a diagram schematically showing an apparatus for diagnosing a battery according to an embodiment of the present disclosure.

FIG. 1 is a diagram schematically illustrating an apparatus 100 for diagnosing a battery according to an embodiment of the present disclosure.

Referring to FIG. 1, the apparatus 100 for diagnosing a battery according to an embodiment of the present disclosure may include a data obtaining unit 110 and a control unit 120.

The data obtaining unit 110 may obtain battery information including voltage and current of the battery in the charging cycle. For example, the data obtaining unit 110 may obtain battery information including voltage and current of the battery measured during the battery charging process.

Here, the charging process of the battery may include constant current (CC) charging and constant voltage (CV) charging. Note that below, for convenience of explanation, constant current charging and CC charging, and constant voltage charging and CV charging are used interchangeably.

Here, the battery refers to an independent cell that has a negative electrode terminal and a positive electrode terminal and is physically separable. As an example, a lithium-ion cell or a lithium polymer cell may be considered a battery. Additionally, the battery may mean a battery module in which a plurality of cells are connected in series and/or parallel. Additionally, the battery may mean a battery pack in which a plurality of battery modules are connected in series and/or parallel. Hereinafter, for convenience of explanation, the battery is explained as meaning one cell.

Depending on the embodiment, the data obtaining unit 110 may obtain battery information measured through a voltage sensing line connected to the positive electrode and the negative electrode of the battery. Additionally, the data obtaining unit 110 may be connected to a current sensor that measures the current of the battery. Also, the data obtaining unit 110 may obtain battery information from the current sensor through the current sensing line.

The data obtaining unit 110 may obtain battery information including the voltage and current of the battery in real time during the charging cycle of the battery.

Depending on the embodiment, the data obtaining unit 110 may be configured to communicate with the outside.

The data obtaining unit 110 may receive battery information from the outside using communication.

The control unit 120 and the data obtaining unit 110 may be connected wired and/or wirelessly to communicate with each other. Additionally, the control unit 120 may receive battery information from the data obtaining unit 110 through a wired line and/or a wireless communication network.

The control unit 120 may calculate a constant current charging capacity ratio and a constant voltage charging capacity ratio during the charging cycle based on the battery information obtained from the data obtaining unit 110.

The charging cycle may mean charging the battery from the lower limit to the upper limit of a preset charging voltage section while maintaining the temperature of the battery constant and then stopping charging. The charging cycle may be included in the charging and discharging cycle along with the discharging cycle. The discharging cycle may mean stabilizing the battery for a certain period of time after the charging cycle is completed, then discharging the battery from the upper limit to the lower limit of a preset discharging voltage section while maintaining the temperature of the battery the same as the charging cycle, and then stopping discharging. The charging voltage section and the discharging voltage section may be the same or different. However, when performing a plurality of charging and discharging cycles, it is desirable that the charging voltage sections between the charging cycles are the same and the discharging voltage sections between the discharging cycles are the same.

In another example, the charging cycle means charging the battery from the lower limit to the upper limit of a preset charging voltage section while maintaining the temperature of the battery constant and then stopping charging. The discharging cycle means starting discharging from the upper limit of a preset discharging voltage section, integrating the discharging current, and stopping discharging when the current integration value reaches a preset discharging capacity. When performing a plurality of charging and discharging cycles, it is desirable that the charging voltage sections between the charging cycles are the same and the discharging capacities between the discharging cycles are the same.

The control unit 120 may calculate a constant current charging capacity ratio and a constant voltage charging capacity ratio during the charging cycle.

Specifically, the control unit 120 may be configured to classify the charging total capacity in the charging cycle into a constant current charging capacity and a constant voltage charging capacity. Additionally, the control unit 120 may be configured to calculate the constant current charging capacity ratio and the constant voltage charging capacity ratio, respectively, based on the charging total capacity, the constant current charging capacity, and the constant voltage charging capacity.

Here, the constant current charging capacity may mean a capacity charged by constant current charging. Conversely, the constant voltage charging capacity may mean a capacity charged by constant voltage charging.

For example, the control unit 120 may calculate the constant current charging capacity ratio by calculating the ratio of the constant current charging capacity to the charging total capacity in the charging cycle. Additionally, the control unit 120 may calculate the constant voltage charging capacity ratio by calculating the ratio of the constant voltage charging capacity to the charging total capacity.

Depending on the embodiment, the control unit 120 may receive information about the charging total capacity, the constant current charging capacity, and the constant voltage charging capacity measured during the CC-CV charging process of the battery. In this case, the control unit 120 may calculate the constant current charging capacity ratio and the constant voltage charging capacity ratio based on the received information.

The control unit 120 may determine the deterioration type of the battery based on the constant current charging capacity ratio and the constant voltage charging capacity ratio. The deterioration type of the battery may include a complex deterioration or a capacity deterioration. The capacity deterioration may refer to a basic deterioration that occurs as the battery is used. Since the capacity deterioration is a basic deterioration that occurs due to battery use, it corresponds to a normal mode in which the battery may be used as expected by deteriorating at a normal rate, so additional charging condition control is not required.

The complex deterioration may mean deterioration in which resistance deterioration occurs in addition to capacity deterioration. In the case of the complex deterioration, since it corresponds to a deterioration acceleration mode, active charging condition control is necessary.

The apparatus 100 for diagnosing a battery according to an embodiment of the present disclosure may specifically diagnose the deterioration type of the battery by comparing the constant current charging capacity ratio and the constant voltage charging capacity ratio of the battery.

The apparatus 100 for diagnosing a battery according to an embodiment of the present disclosure may specifically diagnose the deterioration type of the battery, thereby actively controlling the charging condition in the case of the complex deterioration that is a deterioration acceleration mode.

Meanwhile, the data obtaining unit 110 and the control unit 120 included in the apparatus 100 for diagnosing a battery may optionally include processors, application-specific integrated circuits (ASICs), other chipsets, logic circuits, registers, communication modems, data processing devices, etc. known in the art to execute various control logics performed in the present disclosure. Also, when the control logic is implemented as software, the data obtaining unit 110 and the control unit 120 may be implemented as a set of program modules. At this time, the program module may be stored in the memory and executed by the data obtaining unit 110 and the control unit 120. The memory may be inside or outside each of the data obtaining unit 110 and the control unit 120 and may be connected to the data obtaining unit 110 and the control unit 120 by various well-known means.

In addition, the apparatus 100 for diagnosing a battery may further include a storage unit 130. The storage unit 130 may store data necessary for operation and function of each component of the apparatus 100 for diagnosing a battery, data generated in the process of performing the operation or function, or the like. The storage unit 130 is not particularly limited in its kind as long as it is a known information storage means that can record, erase, update and read data. As an example, the information storage means may include random-access memory (RAM), flash memory, read-only memory (ROM), electrically erasable programmable read-only memory (EEPROM), registers, and the like. In addition, the storage unit 130 may store program codes in which processes executable by the control unit 120 are defined.

Below, the control unit 120 will be described in detail.

Figure 2:
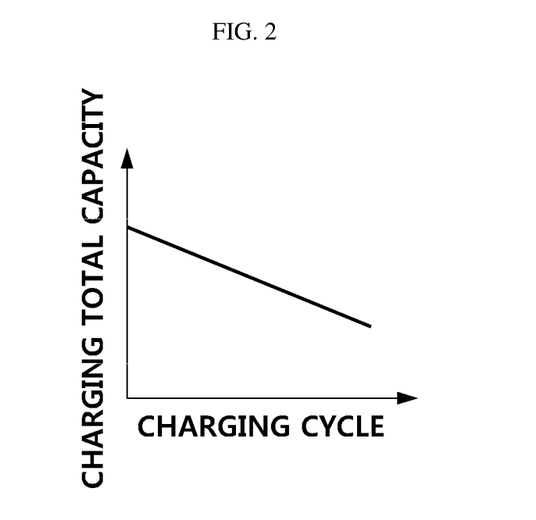
FIG. 2 is a diagram schematically showing a charging total capacity profile according to an embodiment of the present disclosure.

FIG. 2 is a diagram schematically showing a charging total capacity profile according to an embodiment of the present disclosure. FIG. 2 shows an X-Y two-dimensional graph where X is set to the charging cycle and Y is set to the charging total capacity.

Referring to the charging total capacity profile in FIG. 2, it can be seen that the charging total capacity linearly decreases as the charging cycle increases. Generally, as the battery deteriorates (as the charging cycle increases), the total charging capacity of the battery may decrease. Therefore, the control unit 120 cannot diagnose the deterioration type of the battery based on the total capacity reduction using only the profile of FIG. 2.

In other words, it is not possible to diagnose whether the battery is in a capacity deterioration state in which only a capacity deterioration occurs or a complex deterioration state in which a resistance deterioration additionally occurs, and therefore it is not possible to determine whether the battery is in a deterioration acceleration mode.

In one embodiment, the control unit 120 may calculate the constant current charging capacity ratio and the constant voltage charging capacity ratio when the total charging capacity of the battery decreases during the charging cycle of the battery.

Specifically, the control unit 120 may be configured to compare the charging total capacity of a previous charging cycle with the charging total capacity of a current charging cycle, and determine whether to calculate the constant current charging capacity ratio and the constant voltage charging capacity ratio based on the comparison result. For example, when the charging total capacity of the current charging cycle is reduced compared to the charging total capacity of the previous charging cycle, the control unit 120 may calculate the constant current charging capacity ratio and the constant voltage charging capacity ratio for the current charging cycle.

According to an embodiment of the present disclosure, the control unit 120 may classify the charging total capacity in the charging cycle into a constant current charging capacity and a constant voltage charging capacity. For example, control unit 120 may classify the capacity charged by the constant current charging among the charging total capacity into a constant current charging capacity, and classify the capacity charged by the constant voltage charging among the charging total capacity into a constant voltage charging capacity.

The control unit 120 may calculate the constant current charging capacity ratio and the constant voltage charging capacity ratio based on the charging total capacity, the constant current charging capacity, and the constant voltage charging capacity. For example, the control unit 120 may calculate the constant current charging ratio by comparing the constant current charging capacity with the charging total capacity. This will be explained with reference to FIG. 3.

Figure 3:
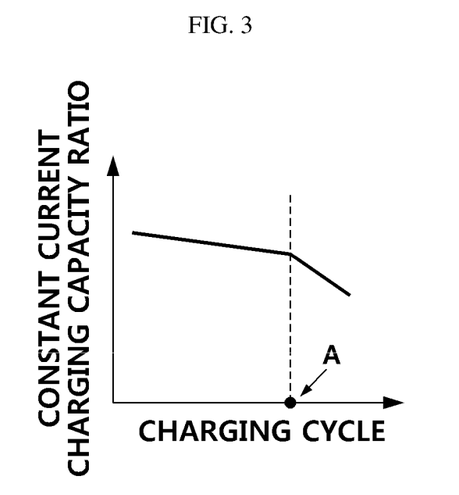
FIG. 3 is a diagram schematically showing a constant current capacity charging ratio profile according to an embodiment of the present disclosure.

FIG. 3 is a diagram schematically showing a constant current capacity charging ratio profile according to an embodiment of the present disclosure. FIG. 3 shows an X-Y two-dimensional graph where X is set to the charging cycle and Y is set to the constant current charging capacity ratio.

Referring to FIG. 3, it can be seen that the constant current charging capacity ratio shows a linear decrease according to cycles, and then sharply decreases at specific point A. Additionally, the control unit 120 may diagnose the deterioration type of the battery based on the change in the constant current charging capacity ratio.

As previously explained, the deterioration type of the battery may include a complex deterioration and a capacity deterioration. The capacity deterioration may refer to a basic deterioration that occurs as the battery is used. The complex deterioration may mean deterioration in which resistance deterioration occurs in addition to capacity deterioration. In the case of the complex deterioration, since it corresponds to the deterioration acceleration mode, active charging condition control is necessary.

The control unit 120 may diagnose the deterioration type of the battery as a complex deterioration or a capacity deterioration based on the increase or decrease in the constant current charging capacity ratio. For example, referring to FIG. 3, the control unit 120 may diagnose that the deterioration type at the specific point A changes from the capacity deterioration to the complex deterioration.

That is, according to an embodiment of the present disclosure, the control unit 120 may diagnose the change in the deterioration type at the specific point A by using the constant current charging capacity ratio. In addition, the control unit 120 may diagnose that the deterioration type of the battery at the specific point A changes from the capacity deterioration where only capacity deterioration occurs to the complex deterioration where resistance deterioration additionally occurs, so it is possible to determine that the battery enters the deterioration acceleration mode at the specific point A.

For another example, the control unit 120 may calculate the constant voltage charging ratio by comparing the constant voltage charging capacity among the charging total capacity with the charging total capacity. This will be explained with reference to FIG. 4.

Figure 4:
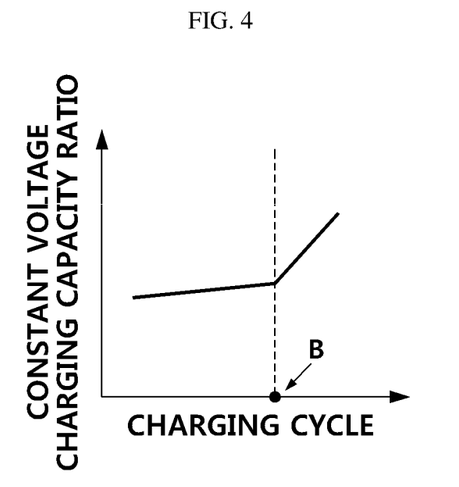
FIG. 4 is a diagram schematically showing a constant voltage capacity charging ratio profile according to an embodiment of the present disclosure.

FIG. 4 is a diagram schematically showing a constant voltage capacity charging ratio profile according to an embodiment of the present disclosure. FIG. 4 shows an X-Y two-dimensional graph where X is set to the charging cycle and Y is set to the constant voltage charging capacity ratio.

Referring to FIG. 4, it can be seen that the constant voltage charging capacity ratio shows a linear increase according to cycles, and then rapidly increases at a specific point B. Additionally, the control unit 120 may diagnose the deterioration type of the battery based on the change in the constant voltage charging capacity ratio.

Preferably, the specific point A in FIG. 3 and the specific point B in FIG. 4 may be points indicating the same charging cycle. For example, the specific point A in FIG. 3 and the specific point B in FIG. 4 may represent 400 cycles.

The control unit 120 may diagnose a change in the deterioration type at the specific point B using the constant voltage charging capacity ratio. The deterioration type of the battery may include a complex deterioration and a capacity deterioration. The control unit 120 may diagnose the deterioration type of the battery as a complex deterioration or a capacity deterioration based on the increase or decrease in the constant voltage charging capacity ratio. For example, referring to FIG. 4, the control unit 120 may diagnose that the deterioration type changes from the capacity deterioration to the complex deterioration at the point B where the slope of the constant voltage charging capacity ratio changes rapidly.

That is, according to an embodiment of the present disclosure, the control unit 120 may diagnose a change in the deterioration type at the specific point B by using the constant voltage charging capacity ratio.

In addition, the control unit 120 may diagnose that the deterioration type of the battery at the specific point B changes from the capacity deterioration where only capacity deterioration occurs to the complex deterioration where resistance deterioration additionally occurs, so it is possible to determine that the battery enters a deterioration acceleration mode at the specific point B.

According to an embodiment of the present disclosure, the control unit 120 may compare the change rate of the charging capacity ratio with a preset change rate. For example, the control unit 120 may compare the change rate of the constant current capacity charging ratio with a preset first change rate. Additionally, the control unit 120 may compare the change rate of the constant voltage charging capacity ratio with a preset second change rate. It will be described in detail with reference to FIGS. 5 and 6.

Figure 5:
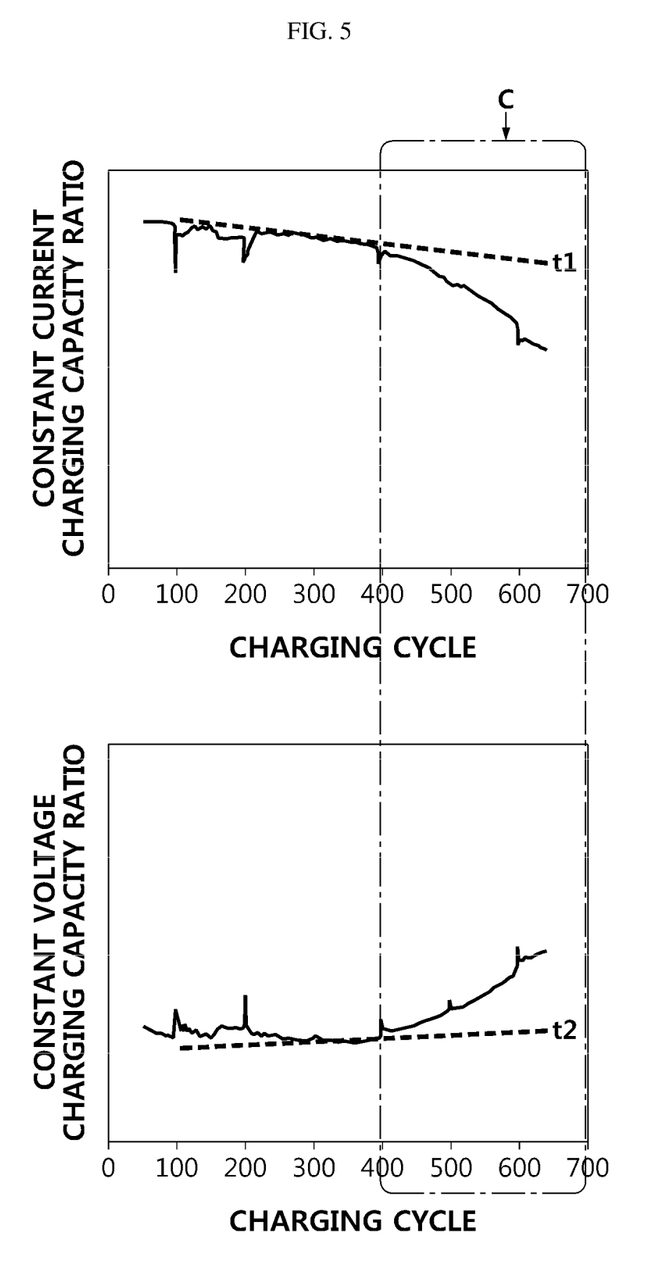
FIG. 5 is a diagram schematically showing a constant current charging capacity ratio profile and a constant voltage charging capacity ratio profile according to another embodiment of the present disclosure.

FIG. 5 is a diagram schematically showing a constant current charging capacity ratio profile and a constant voltage charging capacity ratio profile according to another embodiment of the present disclosure. FIG. 5 shows an X-Y two-dimensional graph in which X is set to the charging cycle, Y is set to the constant current charging capacity ratio, and a preset first change rate t1 is displayed, and an X-Y two-dimensional graph in which X is set to the charging cycle, Y is set to the constant voltage charging capacity ratio, and a preset second change rate t2 is displayed.

The control unit 120 may compare the change rate of the constant current charging capacity ratio with a preset first change rate t1. Additionally, the control unit 120 may compare the change rate of the constant voltage charging capacity ratio with a preset second change rate t2.

For example, the control unit 120 may compare the preset first change rate t1 and the constant current charging capacity change rate using a profile as shown in FIG. 5. Alternatively, the control unit 120 may compare the preset second change rate t2 and the constant voltage charging capacity change rate.

The control unit 120 may diagnose the type of deterioration based on the results of comparing change rates.

In one embodiment, the control unit 120 may diagnose the deterioration type of the battery as the complex deterioration when the change rate of the constant current charging capacity ratio is less than the first change rate t1 and the change rate of the constant voltage charging capacity ratio is greater than or equal to the second change rate t2.

For example, referring to FIG. 5, the control unit 120 may diagnose the deterioration type of the battery as the complex deterioration when it corresponds to a section C in which the constant current charging capacity ratio is less than the first change rate t1 and the change rate of the constant voltage charging capacity ratio is greater than or equal to the second change rate t2.

Figure 6:
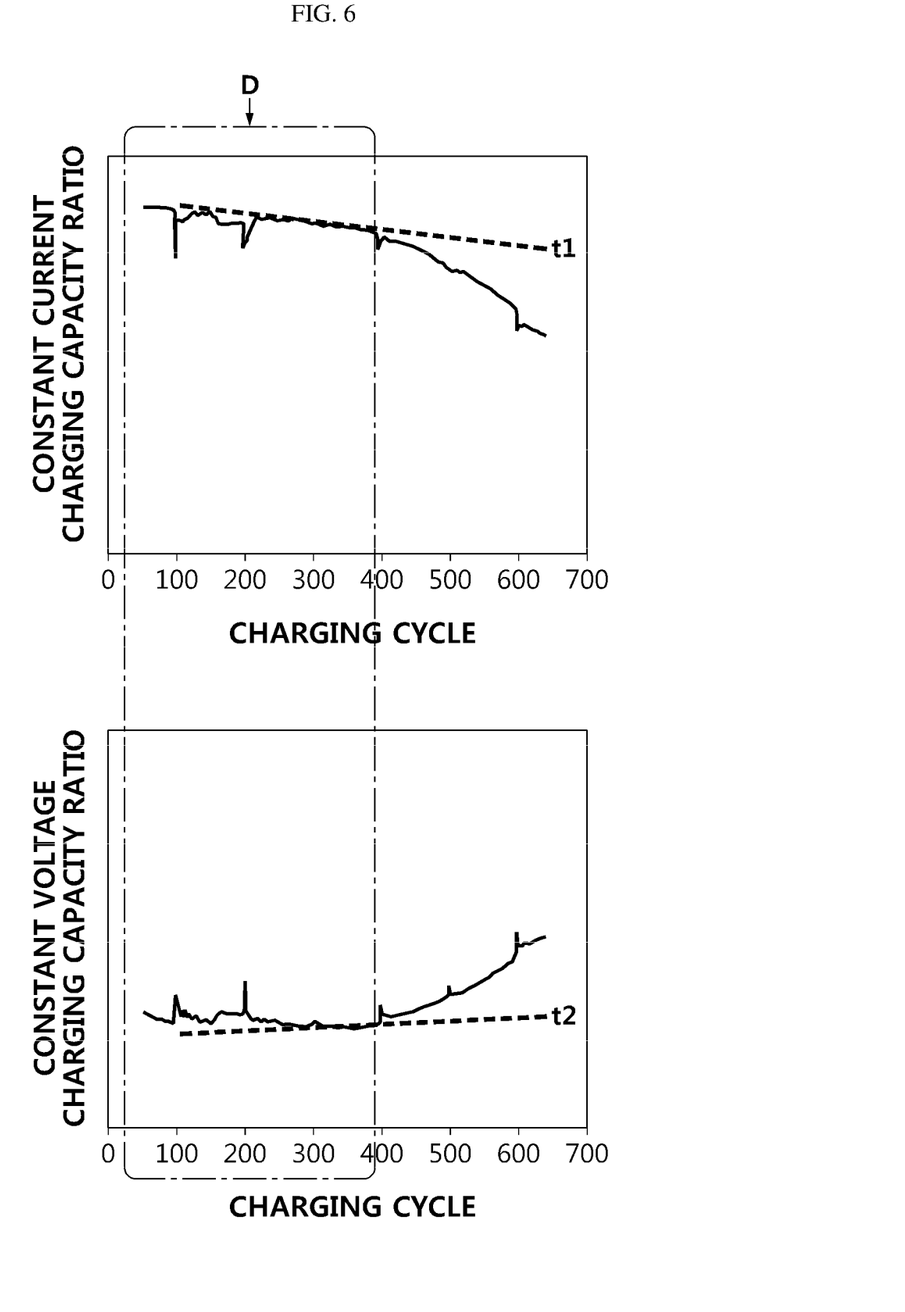
FIG. 6 is a diagram schematically showing a constant current charging capacity ratio profile and a constant voltage charging capacity ratio profile according to another embodiment of the present disclosure.

Conversely, referring to FIG. 6, the control unit 120 may diagnose the deterioration type of the battery as the capacity deterioration when it corresponds to a section D in which the constant current charging capacity ratio is greater than or equal to the first change rate t1 and the change rate of the constant voltage charging capacity ratio is less than the second change rate t2.

If the deterioration type of the battery is diagnosed as the complex deterioration, the control unit 120 may change the charging cut-off condition of the battery. Here, the charging cut-off condition may be set in advance as a condition for terminating CC-CV charging of the battery.

Specifically, the control unit 120 may be configured to change the charging cut-off condition in a way that allows battery charging (CC-CV charging) to end earlier than before. In other words, as the charging cut-off condition changes, the use of the battery at high voltage is reduced, thereby preventing or alleviating battery deterioration.

Below, the charging cut-off condition that can be changed by the control unit 120 will be described.

The charging cut-off condition may include conditions regarding a cut-off voltage, a cut-off current, and a cut-off time. Preferably, when the deterioration type of the battery is diagnosed as the complex deterioration, the control unit 120 may change at least one of the charging cut-off conditions to quickly terminate charging of the battery.

If the deterioration type of the battery is diagnosed as the complex deterioration, the control unit 120 may control CC-CV charging by changing the charging cut-off condition to reduce the time during which the battery stays at high potential.

The cut-off voltage may mean a voltage at a point when CC charging ends. The CC charging progresses until the battery voltage reaches the set cut-off voltage, and the CV charging may begin when the battery voltage reaches the cut-off voltage. Therefore, when the cut-off voltage is reduced, battery charging may end faster than before. For example, the control unit 120 may change and set the cut-off voltage preset for the battery in order to increase the lifespan of the battery based on the diagnosis result. Here, setting the cut-off voltage means setting the upper charging limit voltage of the battery. For example, if the cut-off voltage is reduced according to the diagnosis result, the upper charging limit voltage of the battery may be lower than before. In this case, because the available voltage section of the battery is reduced, use of the battery at high voltage is limited, and thus deterioration of the battery may be prevented or alleviated.

The cut-off current may mean a current at a point when CV charging ends. During the CV charging process of the battery, the voltage of the battery is kept constant to correspond to the cut-off voltage, and the charging current may be reduced. Also, when the charging current reaches the cut-off current, charging of the battery may be terminated. Therefore, if the cut-off current is increased, battery charging may end earlier than before. For example, if the deterioration type of the battery is diagnosed as the complex deterioration, the control unit 120 may increase the charging cut-off current. As the CV charging cut-off current of the charging cycle of the battery is increased, the time during which the battery stays at high potential may decrease.

The cut-off time may mean the time required for CV charging. Therefore, if the cut-off time is reduced, battery charging may be terminated earlier than before.

Depending on the embodiment, the control unit 120 may change at least one of the cut-off voltage, the cut-off current, and the cut-off time in order to effectively reduce the time during which the battery whose deterioration type is diagnosed as the complex deterioration stays at high potential. Preferably, the control unit 120 may change two or more of the cut-off voltage, the cut-off current, and the cut-off time to further reduce the time during which the battery stays at high potential.

Conversely, if the change rate of the constant current charging capacity ratio is greater than or equal to the first change rate and the change rate of the constant voltage charging capacity ratio is less than the second change rate, the control unit 120 may diagnose the deterioration type of the battery as the capacity deterioration.

FIG. 6 is a diagram schematically showing a constant current charging capacity ratio profile and a constant voltage charging capacity ratio profile according to another embodiment of the present disclosure. FIG. 6 shows an X-Y two-dimensional graph in which X is set to the charging cycle, Y is set to the constant current charging capacity ratio, and a preset first change rate is displayed, and an X-Y two-dimensional graph in which X is set to the charging cycle, Y is set to the constant voltage charging capacity ratio, and a preset second change rate is displayed.

For example, referring to FIG. 6, if it corresponds to the section D where the change rate of the constant current charging capacity ratio is greater than or equal to the first change rate and the change rate of the constant voltage charging capacity ratio is less than the second change rate, the control unit 120 may diagnose the deterioration type of the battery as the capacity deterioration.

In other words, the control unit 120 may diagnose the deterioration type of the battery as the capacity deterioration when the charging total capacity decreases, but the change rate of the constant current charging capacity ratio is similar to the first change rate and the change rate of the constant voltage charging capacity ratio is maintained at a level similar to the second change rate.

If the deterioration type of the battery is diagnosed as the capacity deterioration, the control unit 120 may control CC-CV charging of the battery according to a preset charging cut-off condition. In other words, unlike when the deterioration type of the battery is diagnosed as the complex deterioration, when the deterioration type of the battery is diagnosed as the capacity deterioration, the charging cut-off condition may not be changed so that the battery charging ends quickly.

In other words, the apparatus for diagnosing a battery according to an embodiment of the present disclosure has the advantage of setting the charging condition to correspond to the current state of the battery by maintaining or changing the charging cut-off condition according to the state of the battery being diagnosed. In this way, since deterioration of the battery may be prevented based on the charging condition set for each charging cycle, the life expectancy of the battery may be increased.

The apparatus 100 for diagnosing a battery according to the present disclosure may be applied to a battery management system (BMS). That is, the BMS according to the present disclosure may include the apparatus 100 for diagnosing a battery described above. In this configuration, at least some of components of the apparatus 100 for diagnosing a battery may be implemented by supplementing or adding functions of the components included in a conventional BMS. For example, the data obtaining unit 110, the control unit 120 and the storage unit 130 of the apparatus 100 for diagnosing a battery may be implemented as components of the BMS.

Figure 7:
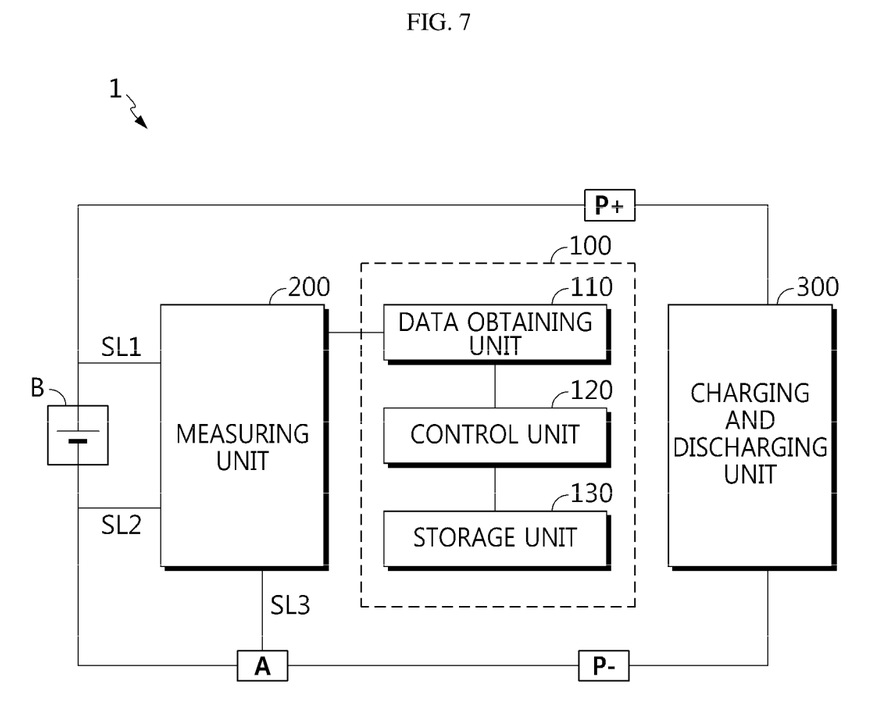
FIG. 7 is a diagram schematically showing an exemplary configuration of a battery pack according to another embodiment of the present disclosure.

FIG. 7 is a diagram schematically showing an exemplary configuration of a battery pack 1 according to another embodiment of the present disclosure.

Additionally, the apparatus 100 for diagnosing a battery according to the present disclosure may be provided in the battery pack 1. That is, the battery pack 1 according to the present disclosure may include the above-described apparatus 100 for diagnosing a battery, the measuring unit 200 and at least one battery B. Additionally, the battery pack 1 may further include electrical components (relays, fuses, etc.) and a case.

The positive electrode terminal of the battery B may be connected to the positive electrode terminal P+ of the battery pack 1, and the negative electrode terminal of the battery B may be connected to the negative electrode terminal P− of the battery pack 1.

The measuring unit 200 may be connected to a first sensing line SL1, a second sensing line SL2, and a third sensing line SL3. Specifically, the measuring unit 200 may be connected to the positive electrode terminal of the battery B through the first sensing line SL1, and may be connected to the negative electrode terminal of the battery B through the second sensing line SL2. The measuring unit 200 may measure the voltage of the battery B based on the voltage measured at each of the first sensing line SL1 and the second sensing line SL2.

Also, the measuring unit 200 may be connected to the current measurement unit A through the third sensing line SL3. For example, the current measurement unit A may be a current meter or a shunt resistance capable of measuring the charging current and discharging current of the battery B. The measuring unit 200 may calculate the charging amount by measuring the charging current of the battery B through the third sensing line SL3. Additionally, the measuring unit 200 may calculate the discharging amount by measuring the discharging current of the battery B through the third sensing line SL3.

The charging and discharging unit 300 may be a charging device or load that can be connected to the battery pack 1. Specifically, one end of the charging and discharging unit 300 may be connected to the positive electrode terminal P+ of the battery pack 1, and the other end may be connected to the negative electrode terminal P− of the battery pack 1. Accordingly, the positive electrode terminal of the battery B, the positive electrode terminal P+ of the battery pack 1, the charging and discharging unit 300, the negative electrode terminal P− of the battery pack 1, and the negative electrode terminal of the battery B may be electrically connected.

Figure 8:
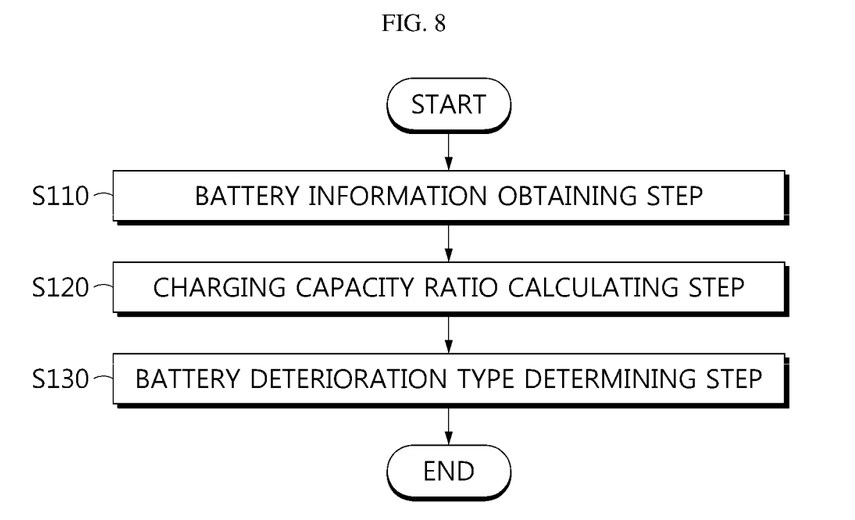
FIG. 8 is a diagram schematically showing a method for diagnosing a battery according to still another embodiment of the present disclosure.

FIG. 8 is a diagram schematically showing a method for diagnosing a battery according to still another embodiment of the present disclosure.

Preferably, each step of the method for diagnosing a battery may be performed by the apparatus 100 for diagnosing a battery. Hereinafter, the content overlapping with the previously described content will be briefly described or omitted.

The battery information obtaining step (S110) is a step of obtaining battery information including voltage and current of a battery during a charging cycle of the battery, and may be performed by the data obtaining unit 110.

For example, the data obtaining unit 110 may obtain battery information including the voltage and current of the battery in the charging cycle. For example, the data obtaining unit 110 may obtain battery information including the voltage and current of the battery measured during the CC-CV charging process of the battery.

For example, the data obtaining unit 110 may obtain the battery information including the voltage and current of the battery in real time during the charging cycle of the battery.

The charging capacity ratio calculating step (S120) is a step of calculating a constant current charging capacity ratio and a constant voltage charging capacity ratio during the charging cycle based on the battery information, and may be performed by the control unit 120.

Specifically, the control unit 120 may be configured to classify the charging total capacity in the charging cycle into a constant current charging capacity and a constant voltage charging capacity. Additionally, the control unit 120 may be configured to calculate a constant current charging capacity ratio and a constant voltage charging capacity ratio, respectively, based on the charging total capacity, the constant current charging capacity, and the constant voltage charging capacity.

Here, the constant current charging capacity may mean a capacity charged by constant current charging. Conversely, the constant voltage charging capacity may mean a capacity charged by constant voltage charging.

For example, the control unit 120 may calculate the constant current charging capacity ratio by calculating the ratio of the constant current charging capacity to the charging total capacity in the charging cycle. Additionally, the control unit 120 may calculate the constant voltage charging capacity ratio by calculating the ratio of the constant voltage charging capacity to the charging total capacity.

Depending on the embodiment, the control unit 120 may receive information about the charging total capacity, the constant current charging capacity, and the constant voltage charging capacity measured during the CC-CV charging process of the battery. In this case, the control unit 120 may calculate the constant current charging capacity ratio and the constant voltage charging capacity ratio based on the received information.

In one embodiment, the control unit 120 may calculate the constant current charging capacity ratio and the constant voltage charging capacity ratio when the total charging capacity of the battery decreases during the charging cycle of the battery.

According to an embodiment of the present disclosure, the control unit 120 may classify the charging total capacity in the charging cycle into a constant current charging capacity and a constant voltage charging capacity. For example, control unit 120 may classify the capacity charged by constant current charging among the charging total capacity as the constant current charging capacity, and classify the capacity charged by constant voltage charging among the charging total capacity as the constant voltage charging capacity.

The control unit 120 may calculate the constant current charging capacity ratio and the constant voltage charging capacity ratio based on the classified constant current charging capacity and the constant voltage charging capacity. For example, the control unit 120 may calculate the constant current charging ratio by calculating the ratio of the constant current charging capacity to the charging total capacity. The control unit 120 may calculate the constant voltage charging ratio by calculating the ratio of the constant voltage charging capacity to the charging total capacity.

The battery deterioration type determining step (S130) is a step of determining the deterioration type of the battery based on the constant current charging capacity ratio and the constant voltage charging capacity ratio, and may be performed by the control unit 120.

The control unit 120 may determine the deterioration type of the battery based on the constant current charging capacity ratio and the constant voltage charging capacity ratio. The deterioration type of the battery may include a complex deterioration or a capacity deterioration.

For example, if the change rate of the constant current capacity charging ratio is less than the first change rate and the change rate of the constant voltage charging capacity ratio is greater than or equal to the second change rate, the control unit 120 may diagnose the deterioration type of the battery as the complex deterioration.

As another example, if the change rate of the constant current charging capacity ratio is greater than or equal to the first change rate and the change rate of the constant voltage charging capacity ratio is less than the second change rate, the control unit 120 may diagnose the deterioration type of the battery as the capacity deterioration.

Meanwhile, when the deterioration type of the battery is diagnosed as the complex deterioration, the control unit 120 may change a charging cut-off condition of the battery so that charging of the battery may be terminated earlier than before. As the charging cut-off condition changes, the time during which the battery stays at high potential in the charging process may decrease.

The embodiments of the present disclosure described above may not be implemented only through an apparatus and a method, but may be implemented through a program that realizes a function corresponding to the configuration of the embodiments of the present disclosure or a recording medium on which the program is recorded. The program or recording medium may be easily implemented by those skilled in the art from the above description of the embodiments.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Additionally, many substitutions, modifications and changes may be made to the present disclosure described hereinabove by those skilled in the art without departing from the technical aspects of the present disclosure, and the present disclosure is not limited to the above-described embodiments and the accompanying drawings, and each embodiment may be selectively combined in part or in whole to allow various modifications.

EXPLANATION OF REFERENCE SIGNS

1: battery pack
100: apparatus for diagnosing a battery
110: data obtaining unit
120: control unit
130: storage unit
200: measuring unit
300: charging and discharging unit

What is claimed is:

1. An apparatus for diagnosing a battery, comprising:
   a control unit configured to:
   obtain each of a constant current charging capacity and a constant voltage charging capacity from a charging total capacity,
   calculate a constant current charging capacity ratio and a constant voltage charging capacity ratio during a charging cycle of the battery based on the charging total capacity, the constant current charging capacity and the constant voltage charging capacity, and
   determine a deterioration type of the battery based on the constant current charging capacity ratio and the constant voltage charging capacity ratio.

2. The apparatus for diagnosing a battery according to claim 1,
   wherein the control unit is configured to calculate the constant current charging capacity ratio and the constant voltage charging capacity ratio in response to the charging total capacity of the battery decreasing during the charging cycle of the battery.

3. The apparatus for diagnosing a battery according to claim 1,
   wherein the control unit is configured to diagnose the deterioration type of the battery as a capacity deterioration type or a complex deterioration type based on a change rate of the constant current charging capacity ratio and a change rate of the constant voltage charging capacity ratio.

4. The apparatus for diagnosing a battery according to claim 3, wherein the control unit is configured to compare the change rate of the constant current charging capacity ratio with a preset first change rate and compare the change rate of the constant voltage charging capacity ratio with a preset second change rate.

5. The apparatus for diagnosing a battery according to claim 4,
wherein the control unit is configured to diagnose the deterioration type of the battery as the complex deterioration type in response to the change rate of the constant current charging capacity ratio being less than the first change rate and the change rate of the constant voltage charging capacity ratio being greater than or equal to the second change rate.

6. The apparatus for diagnosing a battery according to claim 4,
wherein the control unit is configured to diagnose the deterioration type of the battery as the capacity deterioration type in response to the change rate of the constant current charging capacity ratio being greater than or equal to the first change rate and the change rate of the constant voltage charging capacity ratio being less than the second change rate.

7. The apparatus for diagnosing a battery according to claim 3,
wherein the control unit is configured to change a charging cut-off condition of the battery in response to the deterioration type of the battery being diagnosed as the complex deterioration type.

8. The apparatus for diagnosing a battery according to claim 7,
wherein the control unit is configured to reduce a cut-off voltage in the charging cut-off condition in response to the deterioration type of the battery being diagnosed as the complex deterioration type.

9. The apparatus for diagnosing a battery according to claim 7,
wherein the control unit is configured to increase a charging cut-off current in the charging cut-off condition in response to the deterioration type of the battery being diagnosed as the complex deterioration type.

10. The apparatus for diagnosing a battery according to claim 7,
wherein the control unit is configured to reduce a cut-off time in the charging cut-off condition in response to the deterioration type of the battery being diagnosed as the complex deterioration type.

11. A battery pack, comprising the apparatus for diagnosing a battery according to claim 1.

12. A method for diagnosing a battery, comprising:
obtaining each of a constant current charging capacity and a constant voltage charging capacity from a charging total capacity;
calculating a constant current charging capacity ratio and a constant voltage charging capacity ratio during the charging cycle based on the charging total capacity, the constant current charging capacity and the constant voltage charging capacity; and
determining a deterioration type of the battery based on the constant current charging capacity ratio and the constant voltage charging capacity ratio.

\* \* \* \* \*